US006366438B1

(12) United States Patent
Bauer

(10) Patent No.: US 6,366,438 B1
(45) Date of Patent: Apr. 2, 2002

(54) CIRCUIT INTERRUPTER ROTARY CONTACT ARM

(75) Inventor: Rolf-Dieter Bauer, Rastorf (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/518,829

(22) Filed: Mar. 6, 2000

(51) Int. Cl.[7] .............................................. H02H 3/00

(52) U.S. Cl. ...................................... 361/115; 355/16

(58) Field of Search ................................ 361/115, 114; 335/9, 16, 20, 21, 39, 166; 200/240, 275, 308, 322; 218/9, 20, 59, 84

(56) References Cited

U.S. PATENT DOCUMENTS

| | | | | |
|---|---|---|---|---|
| 2,340,682 | A | 2/1944 | Powell | 218/25 |
| 2,719,203 | A | 9/1955 | Gelzheiser et al. | 200/275 |
| 2,937,254 | A | 5/1960 | Ericson | 337/11 |
| 3,158,717 | A | 11/1964 | Jencks et al. | 200/337 |
| 3,162,739 | A | 12/1964 | Klein et al. | 335/9 |
| 3,197,582 | A | 7/1965 | Norden | 200/416 |
| 3,307,002 | A | 2/1967 | Cooper | 337/7 |
| 3,517,356 | A | 6/1970 | Hanafusa | 335/16 |
| 3,631,369 | A | 12/1971 | Menocal | 337/110 |
| 3,803,455 | A | 4/1974 | Willard | 361/106 |
| 3,883,781 | A | 5/1975 | Cotton | 361/37 |
| 4,129,762 | A | 12/1978 | Bruchet | 200/401 |
| 4,144,513 | A | 3/1979 | Shafer et al. | 335/46 |
| 4,158,119 | A | 6/1979 | Krakik | 200/240 |
| 4,165,453 | A | 8/1979 | Hennemann | 200/337 |
| 4,166,988 | A | 9/1979 | Ciarcia et al. | 335/9 |
| 4,220,934 | A | 9/1980 | Wafer et al. | 335/16 |
| 4,255,732 | A | 3/1981 | Wafer et al. | 335/16 |
| 4,259,651 | A | 3/1981 | Yamat | 335/16 |
| 4,263,492 | A | 4/1981 | Maier et al. | 200/288 |
| 4,276,527 | A | 6/1981 | Gerbert-Gaillard et al. | 335/39 |
| 4,297,663 | A | 10/1981 | Seymour et al. | 335/20 |
| 4,301,342 | A | 11/1981 | Castonguay et al. | 200/400 |
| 4,360,852 | A | 11/1982 | Gilmore | 361/98 |
| 4,368,444 | A | 1/1983 | Preuss et al. | 335/166 |
| 4,375,021 | A | 2/1983 | Pardini et al. | 218/25 |
| 4,375,022 | A | 2/1983 | Daussin et al. | 200/308 |
| 4,376,270 | A | 3/1983 | Staffen | 335/21 |
| 4,383,146 | A | 5/1983 | Bur | 200/17 R |
| 4,392,036 | A | 7/1983 | Troebel et al. | 200/322 |
| 4,393,283 | A | 7/1983 | Masuda | 200/51.09 |
| 4,401,872 | A | 8/1983 | Boichot-Castagne et al. | 200/401 |
| 4,409,573 | A | 10/1983 | DiMarco et al. | 335/16 |
| 4,435,690 | A | 3/1984 | Link et al. | 335/37 |
| 4,467,297 | A | 8/1984 | Boichot-Castagne et al. | 335/8 |
| 4,468,645 | A | 8/1984 | Gerbert-Gaillard et al. | 335/42 |
| 4,470,027 | A | 9/1984 | Link et al. | 335/16 |
| 4,479,143 | A | 10/1984 | Watanabe et al. | 348/276 |
| 4,488,133 | A | 12/1984 | McClellan et al. | 335/16 |
| 4,492,941 | A | 1/1985 | Nagel | 335/13 |
| 4,541,032 | A | 9/1985 | Schwab | 361/600 |
| 4,546,224 | A | 10/1985 | Mostosi | 200/401 |
| 4,550,360 | A | 10/1985 | Dougherty | 361/93 |

(List continued on next page.)

FOREIGN PATENT DOCUMENTS

| | | |
|---|---|---|
| EP | 0 560 697 | 9/1993 |
| EP | 0 889 498 | 1/1999 |
| EP | 0 889 498 A2 | 7/1999 |
| EP | WO 99/62092 | 12/1999 |

*Primary Examiner*—Peter S. Wong
*Assistant Examiner*—Lawrence Luk
(74) *Attorney, Agent, or Firm*—Cantor Colburn LLP

(57) ABSTRACT

A circuit interrupter rotary contact arm is provided. Rotational torque is applied to the contact arm by a spring force from one or more springs arranged along the sides of the contact arm. The contact arm includes an edge surface having one or more features or bumps. The bumps are configured cause the one or more springs to exert increased spring force and to increase frictional resistance, which increases the rotational torque required to move the contact arm.

20 Claims, 9 Drawing Sheets

U.S. PATENT DOCUMENTS

| | | | | | |
|---|---|---|---|---|---|
| 4,562,419 | A | | 12/1985 | Preuss et al. | 335/195 |
| 4,589,052 | A | | 5/1986 | Dougherty | 361/94 |
| 4,595,812 | A | | 6/1986 | Tamaru et al. | 200/307 |
| 4,611,187 | A | | 9/1986 | Banfi | 335/16 |
| 4,612,430 | A | | 9/1986 | Sloan et al. | 200/327 |
| 4,616,198 | A | | 10/1986 | Pardini | 335/16 |
| 4,622,444 | A | | 11/1986 | Kandatsu et al. | 200/303 |
| 4,631,625 | A | | 12/1986 | Alexander et al. | 361/94 |
| 4,642,431 | A | | 2/1987 | Tedesco et al. | 200/401 |
| 4,644,438 | A | | 2/1987 | Puccinelli et al. | 361/75 |
| 4,649,247 | A | | 3/1987 | Preuss et al. | 200/244 |
| 4,658,322 | A | | 4/1987 | Rivera | 361/37 |
| 4,672,501 | A | | 6/1987 | Bilac et al. | 361/96 |
| 4,675,481 | A | | 6/1987 | Markowski et al. | 200/430 |
| 4,682,264 | A | | 7/1987 | Demeyer | 361/96 |
| 4,689,712 | A | | 8/1987 | Demeyer | 361/96 |
| 4,694,373 | A | | 9/1987 | Demeyer | 361/96 |
| 4,710,845 | A | | 12/1987 | Demeyer | 361/96 |
| 4,717,985 | A | | 1/1988 | Demeyer | 361/96 |
| 4,733,211 | A | | 3/1988 | Castonguay et al. | 335/192 |
| 4,733,321 | A | | 3/1988 | Lindeperg | 361/96 |
| 4,764,650 | A | | 8/1988 | Bur et al. | 200/281 |
| 4,768,007 | A | | 8/1988 | Mertz et al. | 335/202 |
| 4,780,786 | A | | 10/1988 | Weynachter et al. | 361/87 |
| 4,831,221 | A | | 5/1989 | Yu et al. | 200/553 |
| 4,870,531 | A | | 9/1989 | Danek | 361/93 |
| 4,883,931 | A | | 11/1989 | Batteux et al. | 218/46 |
| 4,884,047 | A | | 11/1989 | Baginski et al. | 335/10 |
| 4,884,164 | A | | 11/1989 | Dziura et al. | 361/97 |
| 4,900,882 | A | | 2/1990 | Bernard et al. | 218/26 |
| 4,910,485 | A | | 3/1990 | Bolongeat-Mobleu et al. | 335/195 |
| 4,914,541 | A | | 4/1990 | Tripodi et al. | 361/94 |
| 4,916,420 | A | | 4/1990 | Bartolo et al. | 335/172 |
| 4,916,421 | A | | 4/1990 | Pardini et al. | 335/185 |
| 4,926,282 | A | | 5/1990 | McGhie | 361/102 |
| 4,935,590 | A | | 6/1990 | Malkin et al. | 218/57 |
| 4,937,706 | A | | 6/1990 | Schueller et al. | 361/744 |
| 4,939,492 | A | | 7/1990 | Raso et al. | 335/42 |
| 4,943,691 | A | | 7/1990 | Mertz et al. | 218/117 |
| 4,943,888 | A | | 7/1990 | Jacob et al. | 361/96 |
| 4,950,855 | A | | 8/1990 | Bolonegeat-Mobleu et al. | 218/66 |
| 4,951,019 | A | | 8/1990 | Gula | 335/166 |
| 4,952,897 | A | | 8/1990 | Barnel et al. | 335/147 |
| 4,958,135 | A | | 9/1990 | Baginski et al. | 335/8 |
| 4,965,543 | A | | 10/1990 | Batteux | 335/174 |
| 4,983,788 | A | | 1/1991 | Pardini | 200/16 R |
| 5,001,313 | A | | 3/1991 | Leclerq et al. | 218/76 |
| 5,004,878 | A | | 4/1991 | Seymour et al. | 355/16 |
| 5,029,301 | A | | 7/1991 | Nebon et al. | 335/16 |
| 5,030,804 | A | | 7/1991 | Abri | 200/323 |
| 5,057,655 | A | | 10/1991 | Kersusan et al. | 218/76 |
| 5,077,627 | A | | 12/1991 | Fraisse | 361/93 |
| 5,083,081 | A | | 1/1992 | Barrault et al. | 324/126 |
| 5,095,183 | A | | 3/1992 | Raphard et al. | 218/59 |
| 5,103,198 | A | | 4/1992 | Morel et al. | 335/6 |
| 5,115,371 | A | | 5/1992 | Tripodi | 361/106 |
| 5,120,921 | A | | 6/1992 | DiMarco et al. | 200/401 |
| 5,132,865 | A | | 7/1992 | Mertz et al. | 361/6 |
| 5,138,121 | A | | 8/1992 | Streich et al. | 200/293 |
| 5,140,115 | A | | 8/1992 | Morris | 200/308 |
| 5,153,802 | A | | 10/1992 | Mertz et al. | 442/206 |
| 5,155,315 | A | | 10/1992 | Malkin et al. | 400/56 |
| 5,166,483 | A | | 11/1992 | Kersusan et al. | 218/71 |
| 5,172,087 | A | | 12/1992 | Castonguay et al. | 335/160 |
| 5,178,504 | A | | 1/1993 | Falchi | 411/553 |
| 5,184,717 | A | | 2/1993 | Chou et al. | 200/401 |
| 5,187,339 | A | | 2/1993 | Lissandrin | 218/84 |
| 5,198,956 | A | | 3/1993 | Dvorak | 361/106 |
| 5,200,724 | A | | 4/1993 | Gula et al. | 335/166 |
| 5,210,385 | A | | 5/1993 | Morel et al. | 218/9 |
| 5,239,150 | A | | 8/1993 | Bolongeat-Mobleu et al. | 218/84 |
| 5,260,533 | A | | 11/1993 | Livesey et al. | 200/401 |
| 5,262,744 | A | | 11/1993 | Arnold et al. | 335/8 |
| 5,280,144 | A | | 1/1994 | Bolongeat-Mobleu et al. | 218/70 |
| 5,281,776 | A | | 1/1994 | Morel et al. | 218/152 |
| 5,296,660 | A | | 3/1994 | Morel et al. | 218/20 |
| 5,296,664 | A | | 3/1994 | Crookston et al. | 200/401 |
| 5,298,874 | A | | 3/1994 | Morel et al. | 335/8 |
| 5,300,907 | A | | 4/1994 | Nereau et al. | 335/172 |
| 5,310,971 | A | | 5/1994 | Vial et al. | 200/244 |
| 5,313,180 | A | * | 5/1994 | Vial et al. | 335/16 |
| 5,317,471 | A | | 5/1994 | Izoard et al. | 361/105 |
| 5,331,500 | A | | 7/1994 | Corcoles et al. | 361/93 |
| 5,334,808 | A | | 8/1994 | Bur et al. | 200/50 |
| 5,341,191 | A | | 8/1994 | Crookston et al. | 335/16 |
| 5,347,096 | A | | 9/1994 | Bolongeat-Mobleu et al. | 218/84 |
| 5,347,097 | A | | 9/1994 | Bolongeat-Mobleu et al. | 218/76 |
| 5,350,892 | A | | 9/1994 | Rozier | 218/119 |
| 5,357,066 | A | | 10/1994 | Morel et al. | 200/17 R |
| 5,357,068 | A | | 10/1994 | Rozier | 218/44 |
| 5,357,394 | A | | 10/1994 | Piney | 361/72 |
| 5,361,052 | A | | 11/1994 | Ferullo et al. | 335/172 |
| 5,373,130 | A | | 12/1994 | Barrault et al. | 218/30 |
| 5,379,013 | A | | 1/1995 | Coudert | 335/17 |
| 5,424,701 | A | | 6/1995 | Castonguary et al. | 335/172 |
| 5,438,176 | A | | 8/1995 | Bonnardel et al. | 200/400 |
| 5,440,088 | A | | 8/1995 | Coudert et al. | 200/303 |
| 5,449,871 | A | | 9/1995 | Batteux et al. | 200/401 |
| 5,450,048 | A | | 9/1995 | Leger et al. | 335/132 |
| 5,451,729 | A | | 9/1995 | Onderka et al. | 200/18 |
| 5,457,295 | A | | 10/1995 | Tanibe et al. | 200/293 |
| 5,467,069 | A | | 11/1995 | Payet-Burin et al. | 335/42 |
| 5,469,121 | A | | 11/1995 | Payet-Burin | 335/16 |
| 5,475,558 | A | | 12/1995 | Barjonnet et al. | 361/64 |
| 5,477,016 | A | | 12/1995 | Baginski et al. | 200/43.11 |
| 5,479,143 | A | | 12/1995 | Payet-Burin | 335/202 |
| 5,483,212 | A | | 1/1996 | Lankuttis et al. | 335/132 |
| 5,485,343 | A | | 1/1996 | Santos et al. | 361/115 |
| D367,265 | S | | 2/1996 | Yamagata et al. | D13/160 |
| 5,493,083 | A | | 2/1996 | Olivier | 200/17 R |
| 5,504,284 | A | | 4/1996 | Lazereth et al. | 200/50.01 |
| 5,504,290 | A | | 4/1996 | Baginski et al. | 200/401 |
| 5,510,761 | A | | 4/1996 | Boder et al. | 335/172 |
| 5,512,720 | A | | 4/1996 | Coudert et al. | 200/400 |
| 5,515,018 | A | | 5/1996 | DiMarco et al. | 335/16 |
| 5,519,561 | A | | 5/1996 | Mrenna et al. | 361/105 |
| 5,534,674 | A | | 7/1996 | Steffens | 218/154 |
| 5,534,832 | A | | 7/1996 | Duchemin et al. | 335/16 |
| 5,534,835 | A | | 7/1996 | McColloch et al. | 335/172 |
| 5,534,840 | A | | 7/1996 | Cuingnet | 337/1 |
| 5,539,168 | A | | 7/1996 | Linzenich | 200/303 |
| 5,543,595 | A | | 8/1996 | Mader et al. | 200/401 |
| 5,552,755 | A | | 9/1996 | Fello et al. | 335/18 |
| 5,581,219 | A | | 12/1996 | Nozawa et al. | 335/132 |
| 5,604,656 | A | | 2/1997 | Derrick et al. | 361/187 |
| 5,608,367 | A | | 3/1997 | Zoller et al. | 335/132 |
| 5,784,233 | A | | 7/1998 | Bastard et al. | 361/36 |
| 6,262,642 | B1 | * | 7/2001 | Bauer | 335/16 |

* cited by examiner

CIRCUIT INTERRUPTER ROTARY CONTACT ARM

BACKGROUND OF THE INVENTION

This invention relates to circuit interrupters, and more particularly, to a circuit interrupter rotary contact arm assemblies for circuit breakers.

Contact pairs are commonly arranged upon one movable rotary contact arm, such as described within U.S. Pat. No. 4,910,485 entitled "MULTIPLE CIRCUIT BREAKER WITH DOUBLE BREAK ROTARY CONTACT". When an overcurrent condition exists, electromagnetic forces cause the rotary contact arm to separate from fixed contacts against the closing force of one or more contact springs.

The rotary contact arm is typically connected to the contact springs via pivotal links. During quiescent operation, the contact springs provide a force to the rotary contact arm via the links in a direction as to drive the rotary contact arm into the fixed contacts. Upon short circuit condition, for example, current levels at or above the "withstand level" of the interrupter, the electromagnetic forces generated between the fixed contacts and the rotary contact arm causes the rotary contact arm to rotate away from the fixed contacts. If the overcurrent level reaches or exceeds the "let-through level", the spring force passes a point commonly referred to as the "overcenter" position and the rotational direction of the contact spring force changes, i.e., the contact springs provide a force to the rotary contact arm via the links in a direction as to drive the rotary contact arm apart from the fixed contacts.

It is desirable to allow the rotary contact arm to pop open and reclose at low short circuit levels, e.g., below the let-through level.

Additionally, it is desirable to allow the rotary contact arm to open and remain locked open at high short circuit levels.

SUMMARY OF THE INVENTION

A circuit interrupting mechanism comprises a first and second electrical conductor and a movable contact arm positioned between said first and second electrical conductor. The contact arm rotates about a central pivot and includes an upper link pivotally attached at an upper link pivot point on the contact arm and a lower link pivotally attached at a lower link pivot point on on the contact arm.

The contact arm is configured, positioned and dimensioned for rotational movement about said central pivot between a first position and a second position. The first position electrically connects said first electrical conductor to said second electrical conductor. The second position prohibits an electrical connection between said first electrical conductor and said second electrical conductor;

The circuit interrupter mechanism further includes a spring positioned to provide a force to the contact arm. A first pin and a second pin are positioned relative to a first end and a second end of the spring. The upper link has an upper link receiving area and the lower link has a lower link receiving area. The first pin is in the upper link receiving area and the second pin is in the lower link receiving area.

An overcenter position of the contact arm is defined between the first position and the second position. The overcenter position is the rotational position where the first pin, the upper link pivot point, the central pivot, the lower link pivot point and the second pin are aligned.

The spring exerts a force urging the first pin toward the upper link receiving area and an opposite force urging the second pin toward said first lower link receiving area. The opposing forces force creating a contact arm torque about said central pivot toward the first position when the contact arm is between the first position and the overcenter position. The contact arm torque reverses past the overcenter position such that the torque is toward the second position when the contact arm is between the overcenter position and the second position.

DETAILED DESCRIPTION OF THE DRAWINGS

Figure 1:
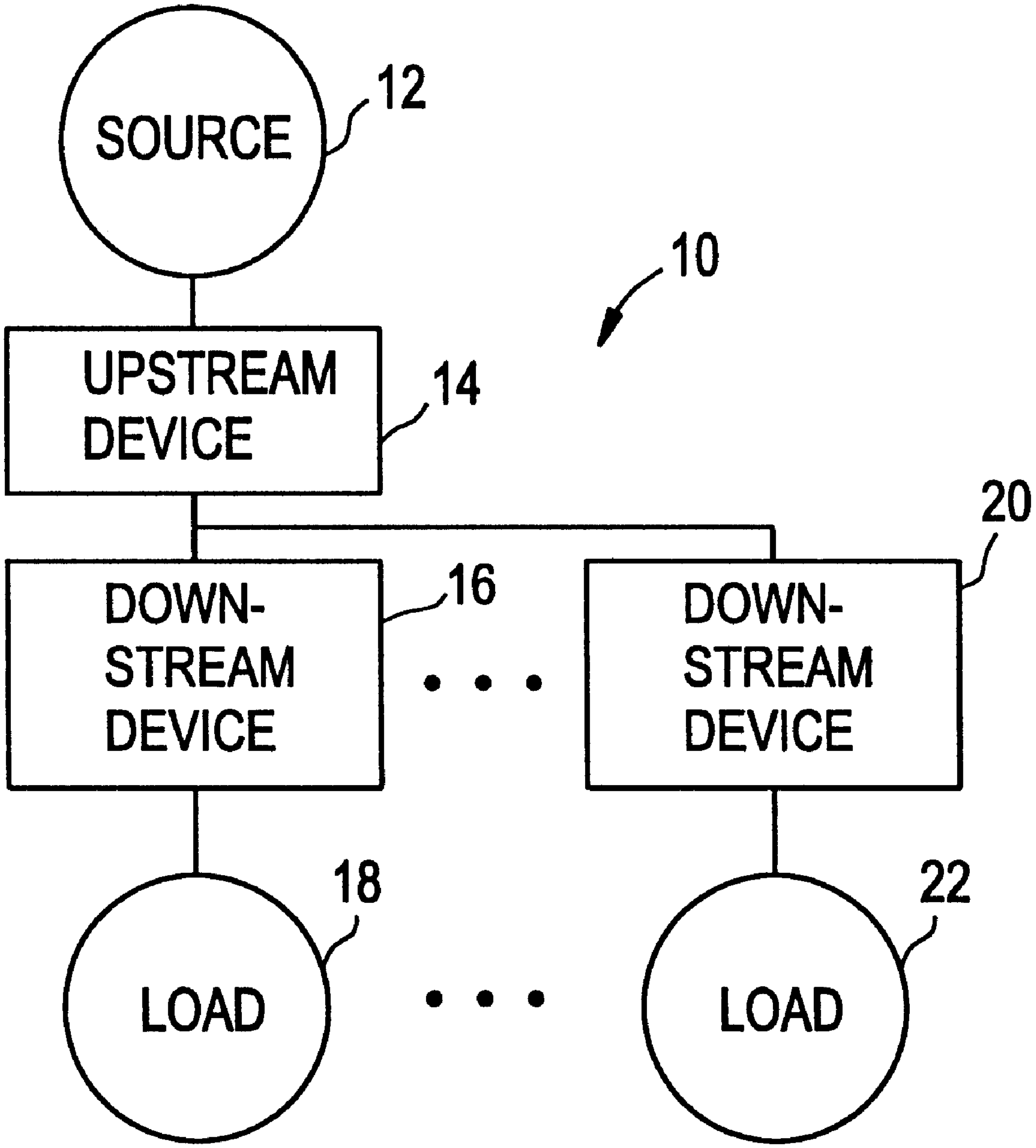
FIG. 1 is a schematic block diagram of a selective circuit trip system.

Referring to FIG. 1, a selective system is generally shown at 10. Selective system 10 comprises a source 12, an upstream device (circuit breaker) 14, a downstream device (circuit breaker) 16, and at least one corresponding load 18. Any number of additional downstream devices (circuit breakers) 20, with corresponding loads 22 may be included. The downstream devices 16, 20 are rated to meet the demands of the corresponding loads 18, 22 and are designed to break (i.e., stop the flow of current) under certain short circuit conditions, e.g., let-through levels. The upstream device 14 is rated to meet the demands of the system and is also designed to break under certain short circuit conditions, which are generally of a higher magnitude than the short circuit conditions of downstream devices 16, 20. Therefore, for example, one of downstream devices 16, 20 may break (e.g., at its let-through level) while the other downstream device and upstream device 14 do not break.

Figure 2:
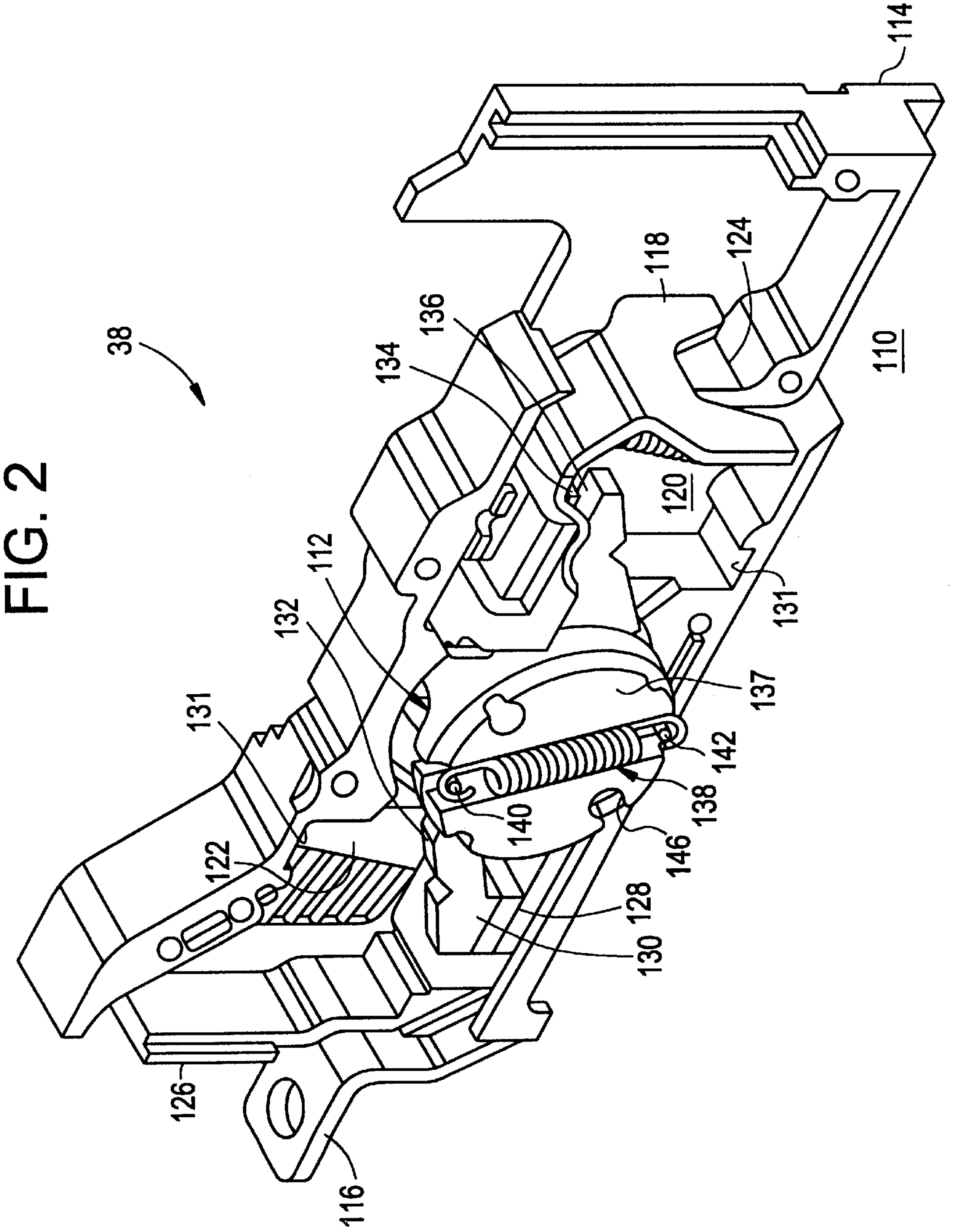
FIG. 2 is a front perspective view of a circuit breaker rotary cassette assembly employing the rotary contact assembly of the present invention.
Figure 3:
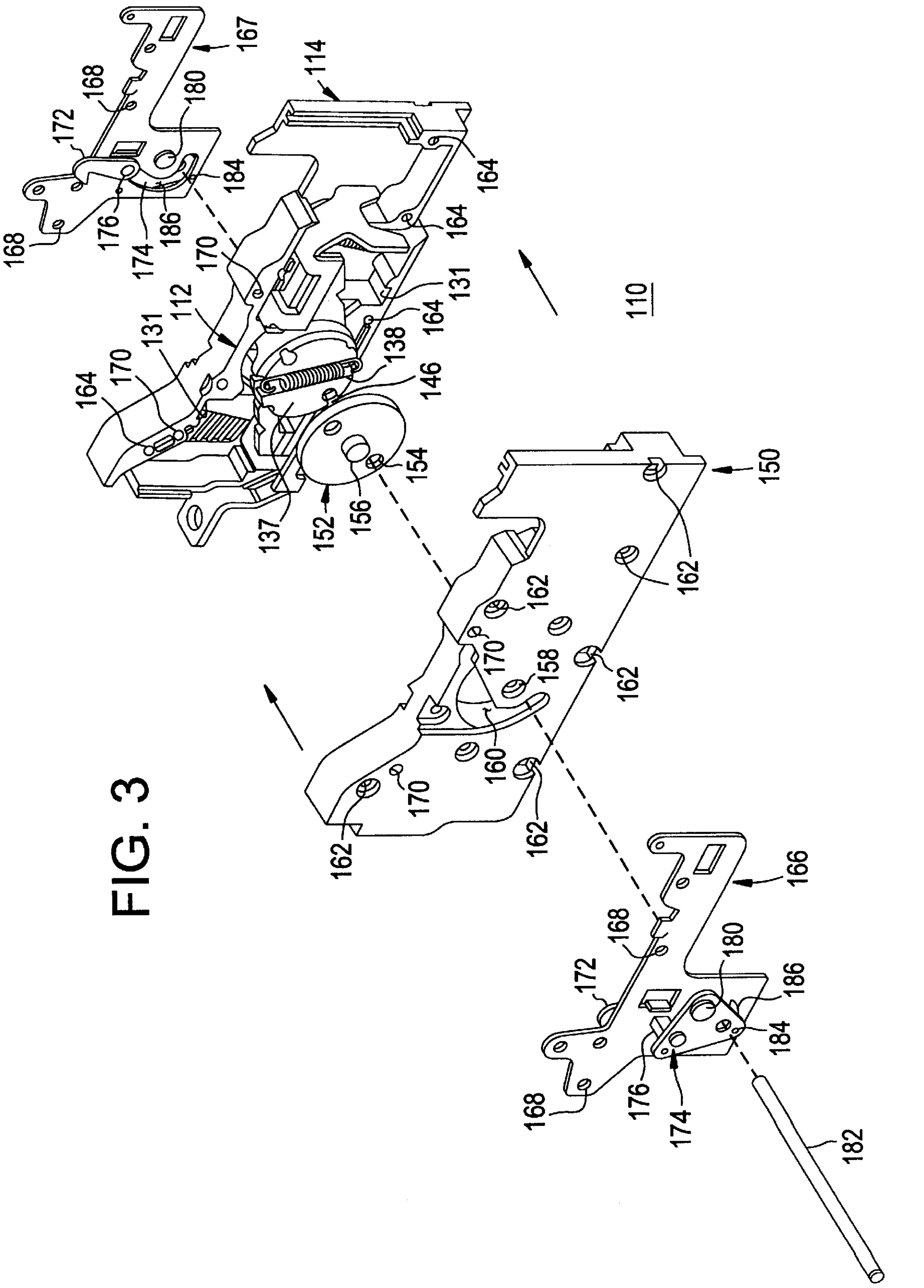
FIG. 3 is a partially exploded perspective view of a cassette assembly with the cassette cover in isometric projection with the rotary contact arrangement of FIG. 2.

Referring to FIGS. 2 and 3, a rotary contact assembly 112 in a circuit breaker cassette assembly 110 is shown. Cassette assembly 110 is, for example, a component of upstream device 14. Rotary contact assembly 112 is positioned within in an electrically-insulative cassette half piece 114 and a complementary electrically-insulative cassette half piece 150. Cassette half piece 150 attaches to cassette half piece 114 by means of apertures 162, 164 and rivets (not shown). Rotary contact assembly 112 is generally disposed intermediate to a line-side contact strap 116, load-side contact strap 118 and associated arc chutes 120, 122.

Line-side contact strap 116 is configured to be electrically connected to line-side wiring from source 12 in an electrical distribution circuit, and load-side contact strap 118 is configured to be electrically connected to load-side wiring to downstream devices 16, 20 via a lug (not shown) or some device such as a bimetallic element or current sensor (not shown). Electrically-insulative shields 124, 126 separate load-side contact strap 118 and line-side contact strap 116 from the associated arc chutes 120, 122 respectively. Both line-side and load-side contact straps 116, 118 are generally U-shaped.

Although a single rotary contact assembly 112 is shown in FIGS. 2 and 3, it is understood that a separate rotary contact assembly is employed within each pole of a multi-pole circuit breaker and operate in a similar manner. The arc chutes 120, 122 are similar to those described within U.S. Pat. No. 4,375,021, entitled "RAPID ELECTRIC ARC EXTINGUISHING ASSEMBLY IN CIRCUIT BREAKING DEVICES SUCH AS ELECTRIC CIRCUIT BREAKERS".

Line-side contact strap 116 and load-side contact strap 118 include stationary contacts 128 and 134, respectively, attached thereto. A movable contact arm 132 is disposed intermediate to stationary contacts 128 and 136. Movable contact arm 132 includes a pair of moveable contacts 130 and 136 configured to mate with stationary contacts 128 and 134, respectively.

Movable contact arm 132 is arranged within a circular rotor 137. Rotor 137 includes a contact spring slot 148 formed on each side thereof. A first contact spring 138 extends between a pair of spring pins 140, 142 within contact spring slot 148 and a second contact spring (not shown) extends between pins 140, 142 in a similar manner on the opposite side of rotor 137. A pair of contact arm stops 131 are formed in cassette half piece 114 and 150.

An aperture 146 extends through rotor 137. Aperture 146 allows for a link connection by means of an extended rotor pin 182 with the circuit breaker operating mechanism (described herein) to allow manual intervention for opening and closing the circuit breaker contacts in the manner described within, for example, U.S. patent application Ser. No. 09/087,038, entitled "ROTARY CONTACT ASSEMBLY", and U.S. patent application Ser. No. 09/384, 908, entitled "LATERALLY MOVING LINE STRAP".

Contact spring 138 proximate to rotor 137 is protected from contamination by the attachment of a rotor cap 152. A cap aperture 154 in rotor cap 152 aligns with rotor aperture 146. A radial protrusion 156 extending from the exterior of cap 152 sits within an aperture 158 formed within cassette half piece 150 and acts as a bearing surface, which allows rotor 137 to rotate freely within a slotted aperture 160 formed within cassette half piece 150. A side (not shown) of rotor 137 proximate cassette half piece 114 is similar to the side of rotor 137 shown in FIG. 2, including a spring 138, rotor cap 152 and aperture 146. Rotor cap 152 proximate cassette half piece 114 also includes a radial protrusion 156 and aperture 154. Radial protrusion 156 proximate cassette half piece 114 extends within an aperture 158 in cassette half piece 114, which also acts as a bearing surface.

When cassette half piece 150 is attached to cassette half piece 114, a pair of circuit breaker operating mechanism side frames 166, 167 are attached to cassette half pieces 150, 114 by structural pins (not shown) extending through apertures 168, 170. A pair of operating mechanism lever links 172, on opposing sides of side frames 166, 167, each connect with a crank lever 174 by a pin 176 extending through a slot 186 formed in side frames 166, 167. Lever links 172 each connect with the circuit breaker operating mechanism (not shown) in the manner described within the aforementioned U.S. patent application Ser. Nos. 09/087,038 and 09/384, 908. Crank levers 174 pivotally connect with side frames 166, 167 by pivots 180 for rotation of crank levers 174 in response to rotation of lever links 172. Operative connection with crank levers 174 and rotor 137 is provided by means of the extended rotor pin 182 that passes through apertures 184 in crank levers 174, slots 186 in side frames 166, 167, slotted apertures 160 in cassette half pieces 150, 114, apertures 154 in rotor caps 152 and aperture 146 within rotor 137, as indicated by dashed lines.

Figure 4:
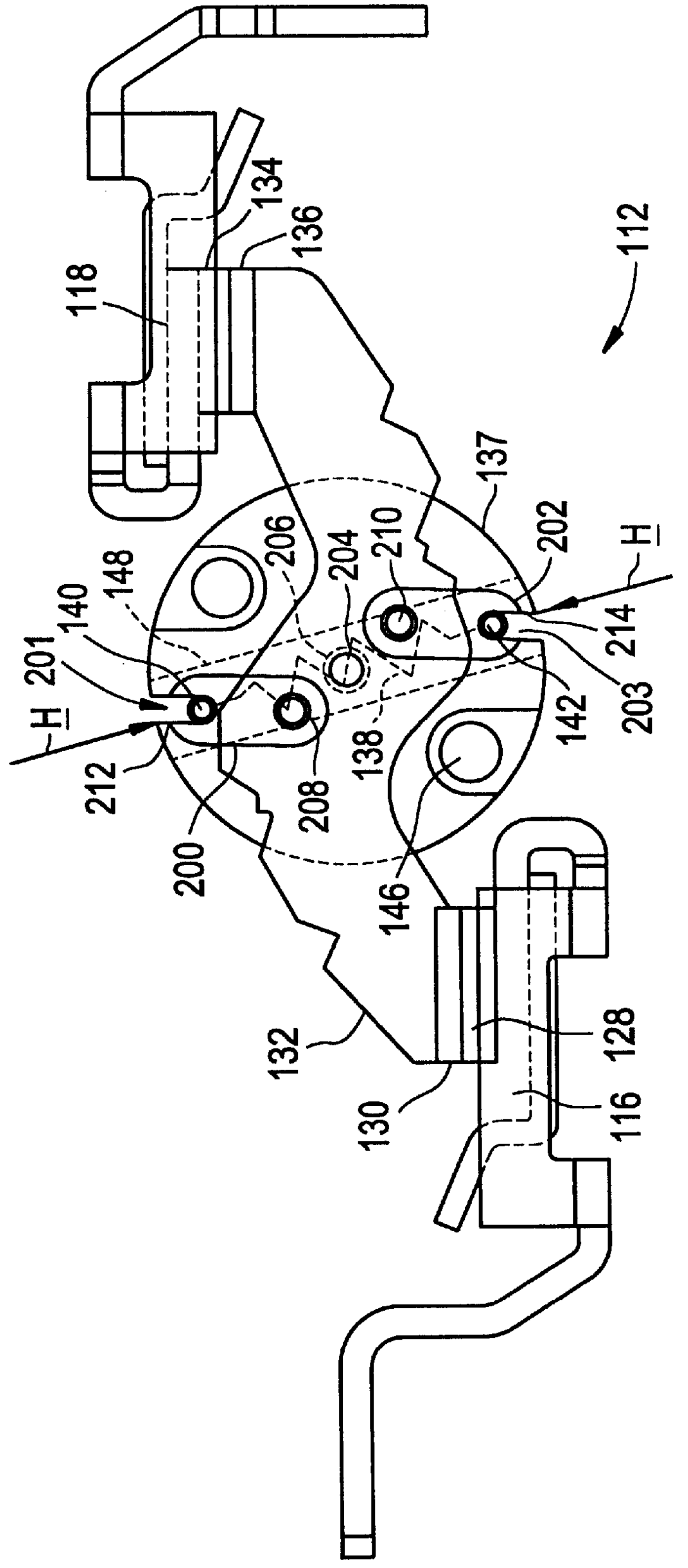
FIG. 4 is an enlarged side view of the cassette assembly of FIG. 2.

Referring now to FIG. 4, a sectional view of rotary contact assembly 112 is provided to expose the arrangement of movable contact arm 132 with respect to contact springs 138 and spring pins 140, 142. Spring pins 140, 142 are positioned on a pair of links 200, 202 attached to each side face of movable contact arm 132. Spring pins 140, 142 are disposed in U-shaped portions 201, 203 on links 200, 202, respectively. It is contemplated that U-shaped portions 201, 203 can be substituted with, for example, apertures configured to accept pins 140, 142 and allow some displacement (e.g., away from each other and against spring 138).

Links 200, 202 are pivotally disposed on each side face of movable contact arm 132 by a set of contact arm pins 208, 210, respectively. Spring pin 140 attaches to one end of each contact spring 138 and is positioned within a pin retainer slot 212 formed in rotor 137. Spring pin 142 attaches to the opposite end of each contact spring 138 and is positioned within a pin retainer slot 214 formed in rotor 137.

A contact arm center pin 204 extends from central portion of movable contact arm 132 and is captured within rotor 137 via an opening 206 disposed in rotor 137 to allow contact arm 132 to rotate relative to rotor 137. Spring pins 140, 142 are positioned in line (co-linear) with central pivot pin 204 so that the spring force, indicated by arrows H, exerted between spring pins 140, 142 is directed to intersect the axis of rotation of movable contact arm 132. The force H is transferred via pins 140, 142, links 200, 202 and pins 208, 210 to movable contact arm 132 to generate a rotational force or torque. In the position viewed in FIG. 4 (i.e., the "closed" position), pins 208 and 210 are offset from the line created by pins 140, 142 and pivot pin 204, allowing the spring force H to provide a counter clockwise torque to movable contact arm 132 causing movable contacts 130, 136 toward fixed contacts 128, 134. Because the force H is centered through the rotational axis of movable contact arm 132, the force of movable contacts 130, 136 onto fixed contacts 128, 134 is substantially equal.

Electrical transport through rotary contact assembly 112 proceeds from the source via line-side contact strap 116 to associated fixed and moveable contacts, 128, 130, respectively, through movable contact arm 132, to fixed contact and movable contacts 130, 136, respectively, and to the load via the associated load-side contact strap 118.

Contact springs 138 provide the force required to maintain movable contact arm 132 in the "closed" position generally during quiescent operation. Reverse loop electromagnetic forces, as is known in the art, are generated at the interface of fixed and moveable contacts 128, 130 and at the interface of fixed and moveable contacts 130, 136. During overcurrent or other short circuit conditions (generally prior to commencement of action by the operating mechanism as described above and caused by, e.g., a trip unit, not shown), the reverse loop electromagnetic forces act against the contact arm torque created by the spring force H.

If the short circuit condition is at a certain level, commonly referred to as a "withstand" level or a "popping" level, fixed and moveable contacts 128, 130, 130, 136 generally "pop", i.e., rapidly separate and engage. During the short circuit condition (generally prior to action by the operating mechanism), contact arm 132 is caused to rotate clockwise about central pivot pin 204 against the contact arm torque, while rotor 137 remains stationary.

An "overcenter" position is attained when pins 208 and 210 are aligned with the line force created by springs 138. When movable contact arm 132 is before the overcenter position, springs 138 and spring force H provide a counter clockwise torque to movable contact arm 132. When movable contact arm 132 is after the overcenter position, springs 138 and spring force H provide a clockwise torque to movable contact arm 132.

If the short circuit condition remains at the withstand level, the movable contact arm 132 remains before the overcenter position, and the reverse loop forces and spring forces oppose each other (hence the "popping" action). At let through levels, the reverse loop forces generally overcome the contact arm torque imparted by spring force H and movable contact arm 132 bypasses the overcenter position. Thus, clockwise of the overcenter position, the reverse loop forces and spring forces both rotate movable contact arm 132 to the "open" position.

Figure 5:
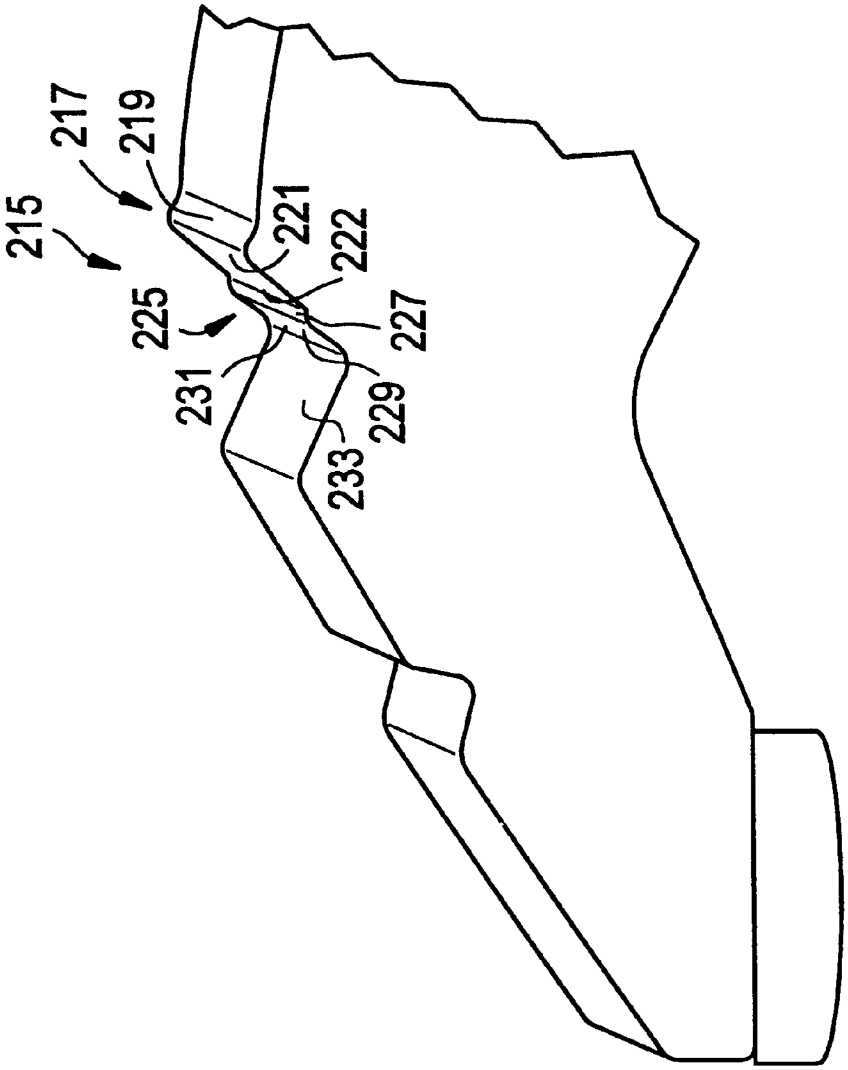
FIG. 5 is an isometric view of a portion of the movable contact arm.

Referring now to FIG. 5, an edge surface 215 of movable contact arm 132 is shown. Edge surface 215 is generally proximate to spring pin 140. Although not shown, a similar edge surface 215 is on the opposite side of movable contact arm 132 adjacent to spring pin 142. Edge surface 215 includes a first bump 217 having a sloped portion 219 and a peak 221. To the left of peak 221 (as viewed in FIG. 5) is a transition surface 223 that continues in to a second bump 225. Second bump 225 includes a sloped portion 227 (commencing at the end of transition surface 223), a peak 229, and a latch seat surface 231. To the left of latch seat surface 231 is a sloped surface 233.

Figure 6:
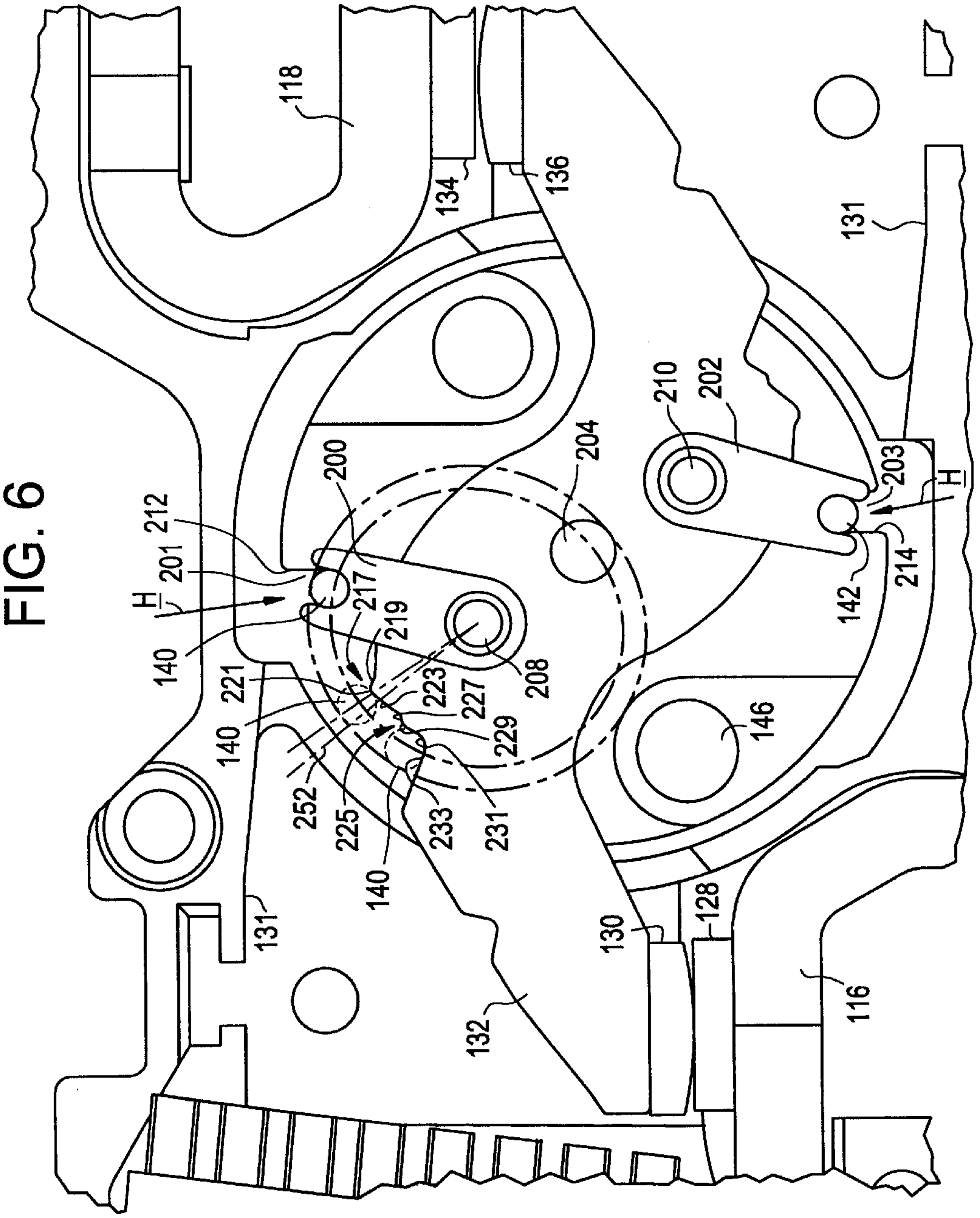
FIG. 6 is an enlarged side view of the rotary contact arm assembly of FIG. 2 in the "CLOSED" position.

Referring now to FIG. 6, an enlarged view of movable contact arm 132 is provided. The overcenter position is indicted by an overcenter line 252. The overcenter position lies on transitional surface 223 between first bump 217 and second bump 225. Spring pins 140 and 142 are disposed against U-shaped portions 201, 203 due to the force transmitted by contact springs 138 (force H. As described previously, the force H is imparts a torque to movable contact arm 132 via pins 140, 142, links 200, 202 and pins 208, 210.

Upon occurrence of a short circuit condition that generates reverse loop forces sufficient to overcome the forces H of contact springs 138 (i.e., reverse loop forces generated by levels higher than the withstand or popping level of the rotary contact assembly 112), movable contact arm 132 rotates clockwise so that movable and fixed contacts 128, 130, 134, 136 separate. The rotation of contact arm 132 moves pins 208 and 210 around pivot pin 204 and toward the line of force H.

Rotor 57 having contact spring 138 therein remains stationary when movable contact arm 132 rotates clockwise due to reverse loop forces overcoming the contact arm torque imparted by spring force H. Therefore, pins 140 and 142 also remain stationary. As contact arm 132 rotates, edge surfaces 215 become closer to spring pins 140, 142, while links 200, 202 rotate counter clockwise about pins 208, 210, respectively.

When spring pins 140, 142 encounter sloped portions 219 of first bump 217, spring force H increases. This higher spring force is due generally to the frictional and/or interference engagement between sloped portions 219 and pins 140, 142, and to the stretching of contact springs 138 caused by the increase in distance between pins 140 and 142. If the condition causing the reverse loop forces continues (temporally), or alternatively causes higher reverse loop forces (e.g., due to increased current levels), and reverse loop forces exceed the required force to overcome sloped portions 219, movable contact arm 132 will continue to rotate clockwise.

Figure 7:
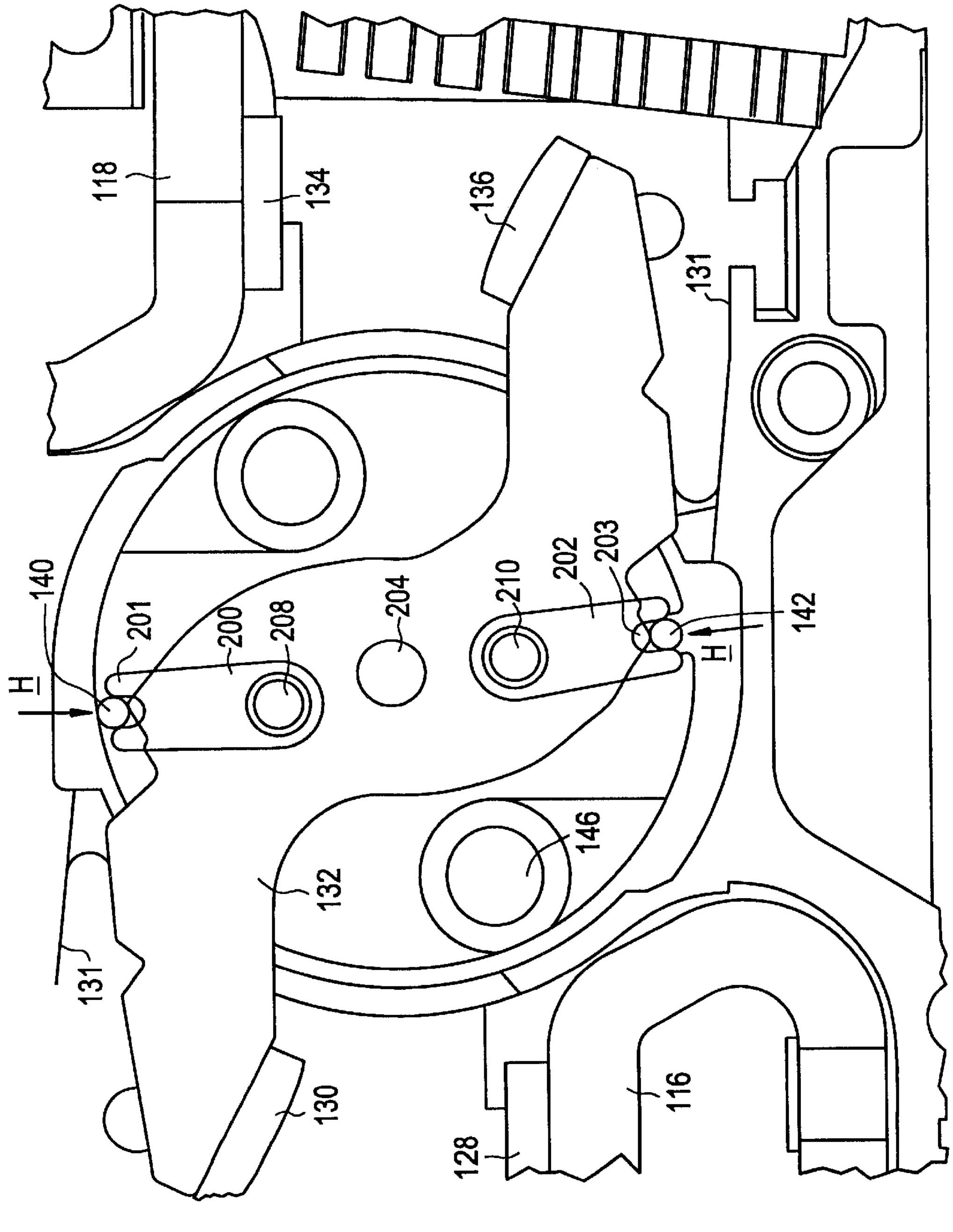
FIG. 7 is an enlarged side view of the rotary contact arm assembly of FIG. 2 having a movable contact arm rotated.

The position of movable contact arm 132, and particularly first bump peaks 221, relative to spring pin 140 is best viewed in FIG. 6. Of course, it is understood by one skilled in the art that contact arm 132 moves, and generally not spring pin 140. This is seen in FIG. 7. The position of peak 221 is slightly before the overcenter position 252. Therefore, prior to springs 138 reversing the direction of rotational force (i.e., from counter clockwise to clockwise), the short circuit level must overcome the increased contact arm torque caused by spring force H acting directly on peaks 221 of first bump 217 and driving contact arm 132 via links 200, 202.

Furthermore, because of U-shaped portions 201 and 203, spring 138 can stretch, thereby allowing spring force H to increase. Referring to FIG. 7, spring pins 140, 142 move away from each other within U-shaped portions 201 and 203 and slotted portions 212 and 214. Spring 138 can stretch due to a cam engagement with various portions of edge surface 215 (e.g., peaks 221), or due to reverse loop forces sufficiently greater than force H.

If, after overcoming peak 221, the condition causing the reverse loop forces continues (temporally), or alternatively causes higher reverse loop forces (e.g., due to increased current levels), movable contact arm 132 continues to rotate clockwise to the overcenter position, wherein transitional surfaces 223 contacts pins 140 and 142, and springs 138 reverse the direction of rotational force (i.e., from counter clockwise to clockwise).

When transitional surfaces 223 are in contact with spring pins 140 and 142, force H generated by springs 138 will draw pins 140 and 142 back together, since the distance between transitional surfaces 223 is less than the distance between peaks 221.

Continued clockwise rotation of movable contact arm 132, e.g., due to continued or increased reverse loop forces, causes second bump sloped portions 227 to contact spring pins 140 and 142. Second bump 225, including sloped portion 227 and peak 229, again increase the force required to continue rotation of movable contact arm 132.

Figure 8:
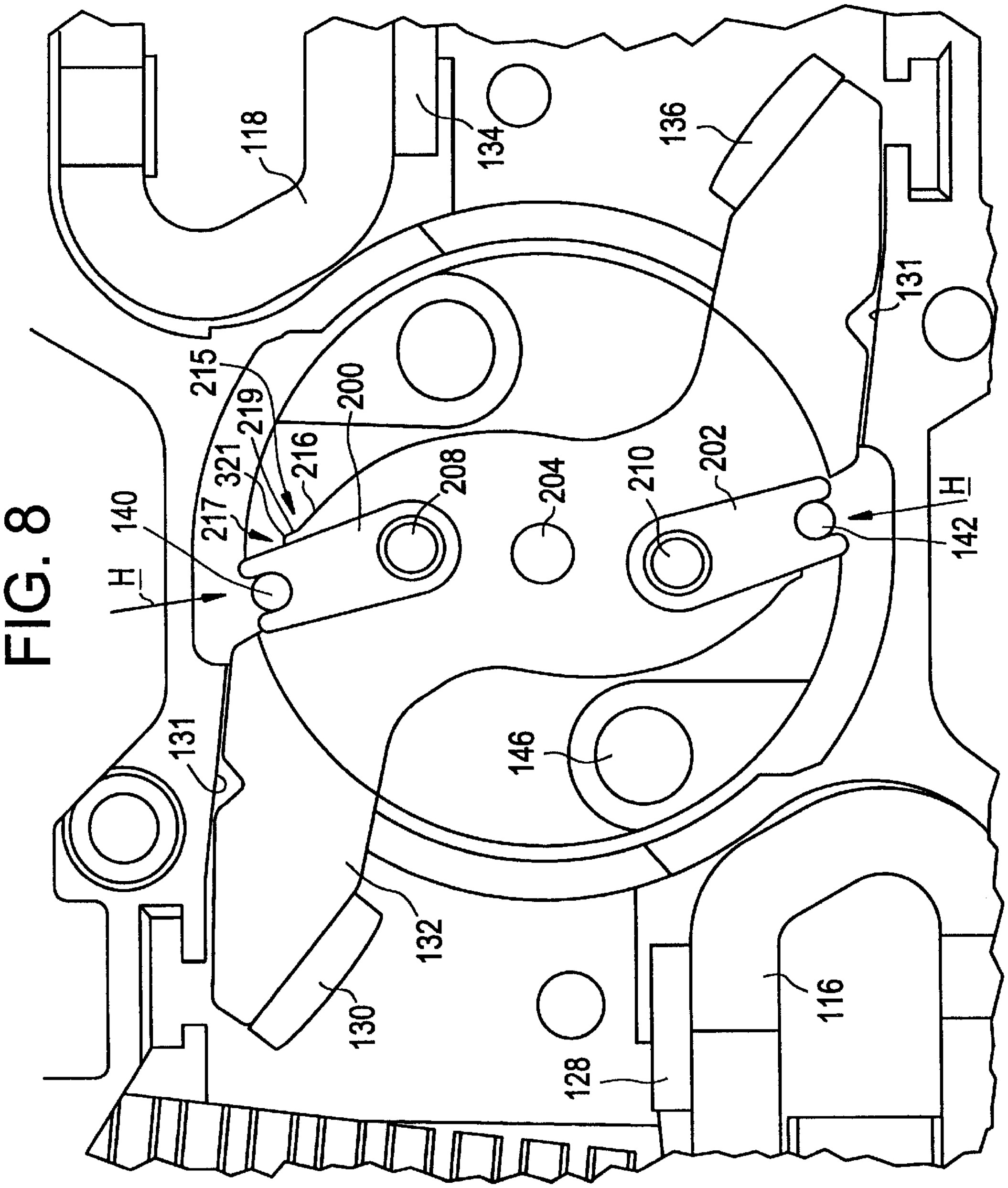
FIG. 8 is an enlarged side view of the rotary contact arm assembly of FIG. 2 in the "OPEN" position.

Referring now to FIG. 8, if the reverse loop forces continue for a long enough time or increase sufficiently, peaks 229 of second bumps 225 are overcome, and movable contact arm 132 locks open by rotating latch seat surfaces 231 into engagement with pins 140, 142. Movable contact arm 132 is generally prevented from further clockwise rotation by sloped surfaces 233 blocking pins 140, 142, and also by interference of contact arm stops 131. Movable contact arm 132 is considered locked open at this stage because a force in the counter clockwise direction (i.e., to close movable contact arm 132) must be great enough to allow pins 140, 142 to overcome peaks 229. This is generally provided only be the operating mechanism, not shown, to reset the movable contact arm.

If the initial reverse loop forces are of sufficient magnitude and/or duration (e.g., let through levels), the clockwise rotation of movable contact arm 132 is effectuated with minimal or no cam action between spring pins 140, 142 and first bump 217. Additionally, at let through levels, the movable contact arm 132 lock open with minimal or no cam action between spring pins 140, 142 and second bump 225, whereby sloped surfaces 233 will be engaged by pins 140, 142. This direct action is possible due to the allowance for pins 140, 142 to extend upon occurrence of reverse loop forces acting on movable contact arm 132.

It is, of course, contemplated that edge surface 215 can have various shapes. For example, second bump 225 can be eliminated if the locking action provided by second bump 225 is not required. Furthermore, additional bumps can be included. Additionally, the particular slopes and dimensions can vary to generate the additional spring force provided by the present invention. Alternatively, the shaped region of edge surface 215 (i.e., the region including first and second bumps 217, 225) can be entirely adjacent to either spring pin 140 or 142.

Figure 9:
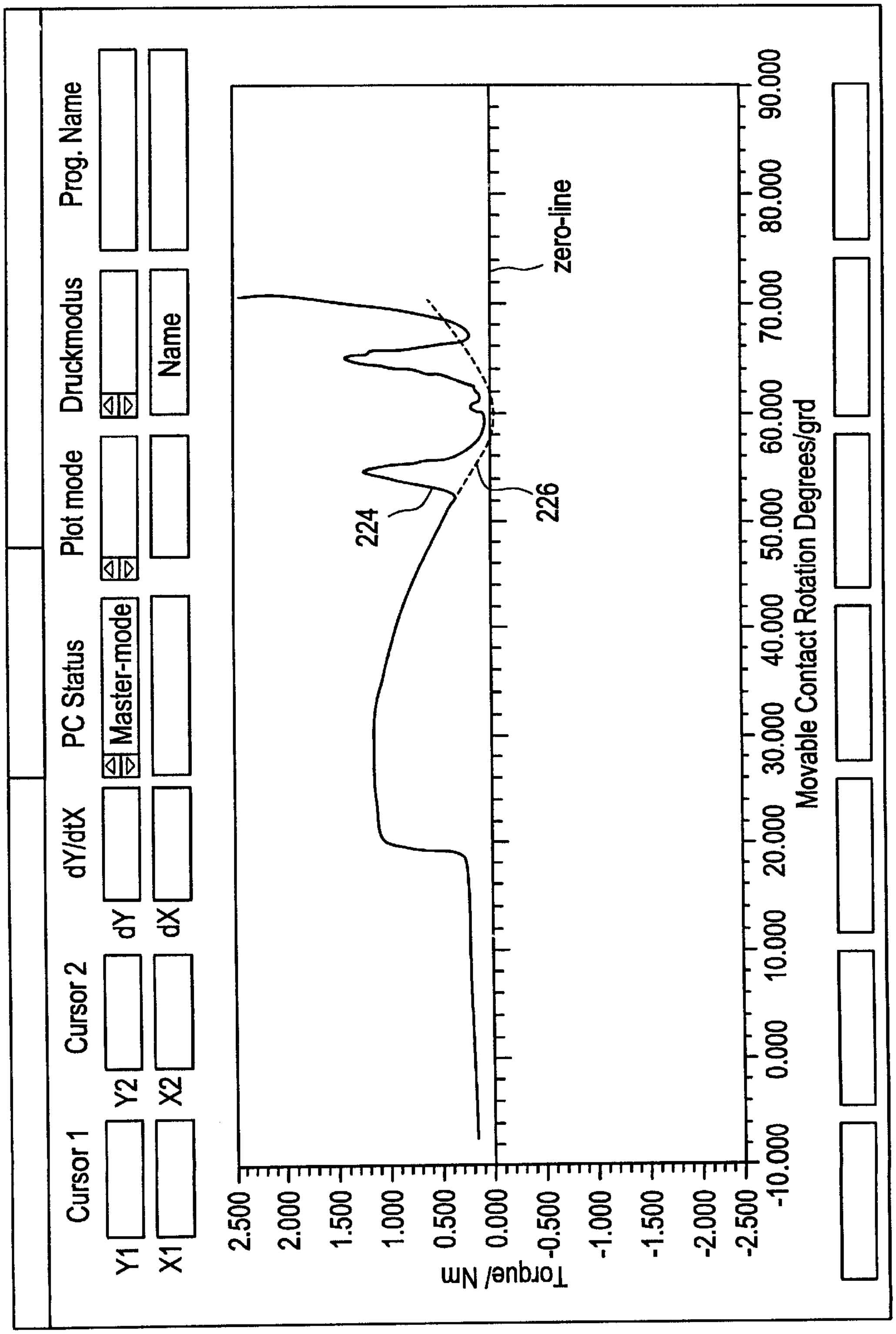
FIG. 9 is a graph of the rotor torque in N-m against the movable contact arm rotation in degrees.

Referring to FIG. 9, curves of torque at the contact arm due to springs (e.g., springs 138) against the rotation degrees of a movable contact arm (e.g., contact arm 132) comparing a system having a movable contact arm including features embodied by the present invention to a system without the features is provided. The curve representative of the system including the features embodied herein is represented as curve 224. The curve representative of the system without the features embodied herein is represented as curve 226. It is, of course, contemplated that actual values described herein are for the particular devices tested, and accordingly will vary depending on numerous factors.

For both curve 224 and 226, an opposing force (e.g., reverse loop force) must exceed the contact arm torque force generated by springs 138 (e.g., H) to rotate movable contact arm 132. To attain this opposing force, the short circuit condition is generally at least equivalent to or greater than the withstand or popping level.

Curves 224 and 226 are initially similar. Very low spring force (approximately 0.2 to 0.3 N-m) is provided prior to about 18.7 degrees rotation of movable contact arm 132. Between about 18.7 and 20 degrees, the spring force increases sharply to a. 1 N-m. At about 27.5, the spring force attains approximately 1.2 N-m, and the spring force decreases until movable contact arm 132 rotates to about 52 degrees.

After about 52 degrees, corresponding to the point of rotation of movable contact arm 132 where the features of the present invention are encountered by spring pins 140, 142, curves 224 and 226 diverge. At 52 degrees, the sloped portions 219 of first bumps 217 are encountered by spring pins 140, 142.

Referring to curve 224, the spring force increases from about 0.3 N-m at about 54 degrees to about 1.2 N-m at about 54 degrees. The curve peak at about 54 degrees corresponds with the contact between peaks 221 of first bumps 217 and spring pins 140, 142.

The spring force decreases sharply to a low at about 58 degrees, corresponding with the overcenter position (indicated in FIG. 6 by overcenter line 252). Also, curve 226 reaches a low point at about 58 degrees, also corresponding with the overcenter position. After rotation beyond the overcenter position, the spring force in the system without the features of the present invention reaches a maximum of about 0.65 N-m at 70 degrees, approximately the rotation limit.

Referring to curve 224, second bump 225 is generally encountered by spring pins 140,142 beyond the overcenter position (i.e., about 58 degrees). Specifically, at about 62 degrees rotation, pins 140, 142 contact sloped portion 227. A peak spring force of approximately 1.4 N-m is attained at about 64.5 degrees rotation of contact arm 132. Rotation beyond about 64.5 degrees positions movable contact arm 132 such that pins 140, 142 are within latch seat portions 231, which causes a decrease in spring force to a minimum of about 0.2 N-m at about 67 degrees. The spring force again sharply increases with increased rotation beyond 67 degrees due to contact between pins 140, 142 and sloped surfaces 233.

To lock closed, therefore, a short circuit must cause a condition with enough force (e.g., loop force) to overcome second bump 225. Once second bump 225 is overcome, reclosing, for example, due to bouncing of the movable contact arm 132, will not occur since the same force (i.e., that required to open past second bump 225) must be overcome to reclose. The reclosing, e.g., for resetting, is provided externally by a means such as a circuit breaker operating mechanism (not shown).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A circuit interrupting mechanism comprising:

a) a first and second electrical conductor;

b) a contact arm comprising a first side surface, a pivot, an first upper link pivotally attached at an upper link pivot point on said first side surface, said first upper link having a first upper link receiving area, and a first lower link pivotally attached at a lower link pivot point on said first side surface, said first lower link having a first lower link receiving area, said contact arm being configured, positioned and dimensioned for rotational movement about said pivot between a first position and a second position, said first position electrically connecting said first electrical conductor to said second electrical conductor and said second position prohibiting an electrical connection between said first electrical conductor and said second electrical conductor;

c) a first spring comprising a first end, a second end, a first pin positioned between said first end and said first upper link receiving area and a second pin positioned between said second end and said first lower link receiving area when said movable contact arm is in said first position, wherein an overcenter position of said contact arm is defined between said first position and said second position, said overcenter position having said first pin, said upper link pivot point, said pivot, said lower link pivot point and said second pin aligned, further wherein said spring exerts a first force urging said first pin toward said first upper link receiving area and a second force urging said second pin toward said first lower link receiving area, said first and second force creating a contact arm torque about said pivot toward said first position when said contact arm is between said first position and said overcenter position, and toward said second position when said contact arm is between said overcenter position and said second position.

2. The circuit interrupting mechanism as in claim 1, said contact arm further comprising an upper surface, said upper surface configured such that said contact arm torque increases at a contact arm position between said first position and said overcenter position.

3. The circuit interrupting mechanism as in claim 2, said upper surface being configured by having an upper surface shaped portion positioned to cause said first pin to contact said upper surface shaped portion when said contact arm moves between said first position and said overcenter position.

4. The circuit interrupting mechanism as in claim 3, wherein said first pin moves within said first upper link receiving area.

5. The circuit interrupting mechanism of claim 2, said contact arm further comprising a lower surface being configured such that said contact arm torque increases at a contact arm position between said first position and said overcenter position.

6. The circuit interrupting mechanism as in claim 5, said lower surface being configured by having a lower surface shaped portion positioned to cause said second pin to contact said lower surface shaped portion when said contact arm moves between said first position and said overcenter position.

7. The circuit interrupting mechanism as in claim 6, wherein said second pin moves within said first lower link receiving area.

8. The circuit interrupting mechanism of claim 4, said contact arm further comprising a lower surface having a lower surface shaped portion positioned to cause said second pin to contact said lower surface shaped portion when said contact arm moves between said first position and said overcenter position.

9. The circuit interrupting mechanism as in claim 8, wherein said second pin moves within said first lower link receiving area.

10. The circuit interrupting mechanism as in claim 1, said contact arm further comprising an upper surface, said upper surface configured such that said contact arm torque increases at a contact arm position between said overcenter position and said second position.

11. The circuit interrupting mechanism as in claim 10, said upper surface being configured by having an upper surface shaped portion positioned to cause said first pin to contact said upper surface shaped portion when said contact arm moves between said overcenter position and said second position.

12. The circuit interrupting mechanism as in claim 11, wherein said first pin moves within said first upper link receiving area.

13. The circuit interrupting mechanism of claim 10, said contact arm further comprising a lower surface being configured such that said contact arm torque increases at a contact arm position between said overcenter position and said second position.

14. The circuit interrupting mechanism as in claim 13, said lower surface being configured by having a lower surface shaped portion positioned to cause said second pin to contact said lower surface shaped portion when said contact arm moves between said overcenter position and said second position.

15. The circuit interrupting mechanism as in claim 14, wherein said second pin moves within said first lower link receiving area.

16. The circuit interrupting mechanism of claim 12, said contact arm further comprising a lower surface having a lower surface shaped portion positioned to cause said second pin to contact said lower surface shaped portion when said contact arm moves between said overcenter position and said second position.

17. The circuit interrupting mechanism as in claim 16, wherein said second pin moves within said first lower link receiving area.

18. The circuit interrupting mechanism as in claim 1, wherein said contact arm further comprises a second side surface, a second upper link pivotally attached at an upper link pivot point on said second side surface, said second upper link having a second upper link receiving area, and a second lower link pivotally attached at a lower link pivot point on said second side surface, said second lower link having a second lower link receiving area, and further comprising a second spring having a first end and a second end, wherein said first pin is positioned in said first end of said first spring, said first and second upper link receiving areas, and said first end of said second spring, and said second pin is positioned in said second end of said first spring, said first and second lower link receiving areas, and said second end of said second spring, further wherein said first and second spring exerts a first force urging said first pin toward said first and second upper link receiving areas and a second force urging said second pin into said first and second lower link receiving areas.

19. A circuit breaker comprising a contact structure controllable by an operating mechanism, said contact structure comprising a contact arm disposed on a pivot in a rotor structure, said rotor structure configured for interfacing said operating mechanism to move said rotor structure and said contact arm in unison, said rotor structure further comprising a spring interfacing said contact arm via a first and second pin disposed in an upper and lower link pivotally coupled to said contact arm, said spring providing a spring bias on said contact arm, said contact arm being movable about said pivot within said rotor structure when a force is applied against said spring bias while said rotor structure remains substantially stationary, said contact arm having a portion configured for frictionally engaging said first pin when said contact arm moves within said rotor structure while said rotor structure remains substantially stationary, wherein said spring bias increases when said first pin is frictionally engaged by said portion.

20. A selective system of circuit breakers, wherein at least one of said circuit breakers comprises a contact structure controllable by an operating mechanism, said contact structure comprising a contact arm disposed on a pivot in a rotor structure, said rotor structure configured for interfacing said operating mechanism to move said rotor structure and said contact arm in unison, said rotor structure further comprising a spring interfacing said contact arm via a first and second pin disposed in an upper and lower link pivotally coupled to said contact arm, said spring providing a spring bias on said contact arm, said contact arm being movable about said pivot within said rotor structure when a force is applied against said spring bias while said rotor structure remains substantially stationary, said contact arm having a portion configured for frictionally engaging said first pin when said contact arm moves within said rotor structure while said rotor structure remains substantially stationary, wherein said spring bias increases when said first pin is frictionally engaged by said portion.

* * * * *